US008573845B2

(12) United States Patent
Turover et al.

(10) Patent No.: US 8,573,845 B2
(45) Date of Patent: Nov. 5, 2013

(54) APPARATUS, SYSTEMS AND METHODS FOR PREPARING FOOD IN PACKAGES HAVING INTEGRAL COMPARTMENTS

(75) Inventors: Alan S. Turover, Glencoe, IL (US); Antim G. Straus, Springfield, MO (US); Dustin J. Hillinski, Cranberry Township, PA (US)

(73) Assignee: The Turover Straus Group, Inc., Glencoe, IL (US)

( * ) Notice: Subject to any disclaimer, the term of this patent is extended or adjusted under 35 U.S.C. 154(b) by 0 days.

(21) Appl. No.: 13/285,071

(22) Filed: Oct. 31, 2011

(65) Prior Publication Data

US 2012/0244265 A1    Sep. 27, 2012

Related U.S. Application Data

(60) Provisional application No. 61/465,474, filed on Mar. 21, 2011.

(51) Int. Cl.
*B65D 30/00* (2006.01)
*B65D 30/22* (2006.01)
*B65D 33/06* (2006.01)

(52) U.S. Cl.
USPC .................. 383/38; 383/19; 383/39; 383/40; 383/37

(58) Field of Classification Search
USPC .......................................... 383/38, 19, 39, 40
See application file for complete search history.

(56) References Cited

U.S. PATENT DOCUMENTS

| | | | |
|---|---|---|---|
| 2,741,559 A | 4/1956 | Banownz | |
| 2,800,269 A | 7/1957 | Smith | |
| 3,171,581 A | 3/1965 | Kugler | |
| 3,542,032 A * | 11/1970 | Spencer, Jr. | 607/114 |
| 4,557,377 A * | 12/1985 | Maloney | 206/219 |
| 4,608,043 A * | 8/1986 | Larkin | 604/87 |
| 4,715,963 A * | 12/1987 | Jones | 210/781 |
| 4,730,381 A * | 3/1988 | Dirksing | 29/451 |
| 4,797,010 A | 1/1989 | Coelho | |
| 4,873,101 A | 10/1989 | Larson et al. | |
| 4,923,701 A * | 5/1990 | VanErden | 426/113 |
| 5,003,142 A | 3/1991 | Fuller | |
| 5,075,119 A * | 12/1991 | Mendenhall | 426/113 |
| 5,380,093 A * | 1/1995 | Goldman | 383/38 |

(Continued)

FOREIGN PATENT DOCUMENTS

| JP | 01-288256 | 11/1989 |
|---|---|---|
| JP | 5278751 | 12/1993 |
| JP | 08-294377 | 11/1996 |
| JP | 2004-331184 | 11/2004 |

OTHER PUBLICATIONS

International Search Report and Written Opinion of the International Searching Authority for PCT/US2012/062656.

*Primary Examiner* — Nathan J Newhouse
*Assistant Examiner* — Derek Battisti
(74) *Attorney, Agent, or Firm* — Scherrer Patent & Trademark Law, P.C.; Stephen T. Scherrer

(57) ABSTRACT

Food packaging of the present invention is particularly adapted for microwave, conventional oven, stove top and boiler cooking techniques and includes an integral pocket or trap compartment for receiving fluids created by the cooking process, such as grease. Embodiments further include food packaging having food compartments that may contain food products that may be individually selected and/or combined together to form combination food products.

13 Claims, 12 Drawing Sheets

(56) References Cited

U.S. PATENT DOCUMENTS

| | | |
|---|---|---|
| 5,785,428 A | 7/1998 | Mazzocchi |
| 5,871,790 A | 2/1999 | Monier et al. |
| 5,934,459 A | 8/1999 | Winsell |
| D420,899 S | 2/2000 | Jubar |
| 6,020,013 A | 2/2000 | Kozma |
| 6,045,264 A | 4/2000 | Minlea |
| 6,054,698 A | 4/2000 | Mast |
| 6,200,027 B1 | 3/2001 | Jones |
| 6,322,044 B1 * | 11/2001 | Vangedal-Nielsen ........... 249/61 |
| 6,384,391 B1 | 5/2002 | Beckwith |
| 6,488,973 B1 | 12/2002 | Wright |
| 6,499,600 B2 | 12/2002 | Koyannagi |
| 6,655,837 B2 | 12/2003 | Matsuda |
| 6,702,461 B2 * | 3/2004 | Vangedal-Nielsen ........... 383/38 |
| 6,896,919 B2 | 5/2005 | Wright |
| 6,953,148 B2 | 10/2005 | Esakov et al. |
| 7,015,442 B2 | 3/2006 | Tucker, Jr. et al. |
| 2002/0067865 A1 | 6/2002 | Stutzman |
| 2003/0059128 A1 * | 3/2003 | Vangedal-Nielsen ............. 383/4 |
| 2006/0257054 A1 * | 11/2006 | Henn et al. ...................... 383/38 |
| 2007/0189640 A1 * | 8/2007 | Linton ............................. 383/38 |
| 2007/0269142 A1 * | 11/2007 | Tyska et al. ..................... 383/38 |
| 2008/0248162 A1 | 10/2008 | Cook et al. |
| 2009/0238495 A1 * | 9/2009 | Anderson ......................... 383/7 |
| 2010/0047403 A1 | 2/2010 | Johnson |
| 2010/0140119 A1 | 6/2010 | Katsuki |
| 2010/0266732 A1 | 10/2010 | Thomas et al. |

\* cited by examiner

APPARATUS, SYSTEMS AND METHODS FOR PREPARING FOOD IN PACKAGES HAVING INTEGRAL COMPARTMENTS

The present invention claims priority to U.S. Provisional Patent Application No. 61/465,474, filed Mar. 21, 2011 entitled, "Food cooking package having integral grease trap," which is incorporated herein by reference in its entirety.

TECHNICAL FIELD

The following disclosure illustrates and describes an invention in food packaging that is particularly adapted for microwave, conventional oven, stove top and boiler cooking techniques and includes an integral pocket or trap compartment for receiving fluids created by the cooking process, such as grease. Variations of the invention facilitate removal of the trapped fluid and grease after completion of the cooking process, enable retention of the trapped fluids and grease and disposal of the package with the trapped fluids and grease retained therein, provide interconnected food and trap compartments so that fluids of different densities derived from the cooked food are separated into separate trap compartments, and provide a plurality of food compartments selectively interconnected so that fluid or moisture from one compartment is conveyed to a second food compartment containing a moisture absorbing food product. Other variations utilize fluid and grease flow passages between compartments that prevent or inhibit clogging by fluids or grease passing from a food cooking compartment to a trap compartment, or provide flow passages for mixing ingredients of a sauce, dressing, gravy or other like food enhancement material to a main food product, whether cooked or not cooked.

BACKGROUND

It is, of course, generally known to cook foods using heat or heat generating devices, such as ovens, stoves, burners, grills, and, especially in the modern age, microwave ovens that utilize microwave energy to excite polar molecules in foods, thereby heating and cooking the same. To cook food, it is typical to utilize a pot, pan or other receptacle, and to place the food to be cooked within the receptacle. The receptacle is then typically added to the heat source for cooking thereof.

However, traditional cooking within pots, pans and other receptacles creates significant problems for the cook. The receptacles tend to get messy and must be cleaned after cooking therein. The act of cooking may also generate unpleasant cooking odors that are difficult to contain, especially with the cooking of seafood and meats. Oftentimes, inexperience may lead to improperly cooked foods, which may pose not only problems with the taste and/or texture of foods, but also with safety, especially if food is undercooked. And if foods are overcooked, they can lose moisture content making the foods difficult to eat and lacking in flavor.

Oftentimes, to properly prepare food while cooking, ingredients must be added to the food, such as oils, water, spices, flavorings, and other like ingredients. It can be difficult to properly add ingredients in correct ratios and at correct times to prepare recipes and properly cook food Raw food may also pose a significant health risk, especially in the touching of raw meats by consumers, which may carry bacteria and other pathogens, causing illness to the consumers.

The above problems are especially exacerbated when using a heating source that is enclosed, such as an oven, boiler or, especially, a microwave oven. Specifically, it is oftentimes difficult to enter the enclosed space to add ingredients or to properly gauge the cooking of food therein.

In other circumstances, cooking foods produce oils and moisture that emanate from the cooking foods that may be collected and utilized to make other foods, such as gravies, sauces, and other like foods. It may be difficult to collect these materials during the food cooking process.

Moreover, consumers may lack the time necessary to properly prepare foods so that the foods are cooked well and are tasty to the consumer. Many families are pulled in many different directions, and many consumers may find it difficult to create savory meals that are healthy, tasty and well-prepared.

In addition, fresh and/or raw goods for consumption, such as, for example, vegetables, may be prepared by mixing the same with sauces, dressings or the like. It may be difficult to prepare a sauce or dressing for vegetables, such as a salad, that provides a tasty mixture without making a mess or mixing in improper ratios.

A need, therefore, exists for apparatus, systems and methods for increasing the speed and ease of cooking while minimizing the effort required for kitchen and utensil cleanup. Specifically, a need exists for apparatus, systems and methods for food cooking packaging that is easily disposable and provides a non-messy package which facilitates microwave, conventional oven, stove top and/or boiler cooking of meat, fish, vegetables, and other food products.

Moreover, a need exists for apparatus, systems and methods that eliminate unpleasant cooking odors associated with the cooking of foods, especially seafood. Moreover, a need exists for the rapid cooking of foods that retain moisture within the foods and provide a juicy eating experience for the cooked foods.

A need further exists for apparatus, systems and methods for cooking of foods without the need to add oils, water, spices, flavorings, or other ingredients during the cooking process. Moreover, a need exists for apparatus, systems and methods to eliminate the handling of raw foods that may pose significant health problems for consumers.

Further, a need exists for apparatus, systems and methods that collect and separate greases, oils and moisture from cooking food either for disposal thereof or that may be utilized in the creation of other food products, such as gravies, sauces and other like food products. Moreover, a need exists for apparatus, systems and methods that utilize cooking byproducts from a cooking food that may be utilized to flavor one or more other food products.

Still further, a need exists for apparatus, systems and methods for providing separate compartments for ingredients in a mixture, such as ingredients for a sauce, dressing, or other like mixture, for fresh and/or uncooked food products, such as vegetables or the like, wherein the ingredients can be mixed together to form a mixed product.

SUMMARY OF THE INVENTION

The present invention relates to an invention in food packaging that is particularly adapted for microwave, conventional oven, stove top and boiler cooking techniques and includes an integral pocket or trap compartment for receiving fluids created by the cooking process, such as grease. Variations of the invention facilitate removal of the trapped fluid and grease after completion of the cooking process, enable retention of the trapped fluids and grease and disposal of the package with the trapped fluids and grease retained therein, provide interconnected food and trap compartments so that fluids of different densities derived from the cooked food are separated into separate trap compartments, and provide a plurality of food compartments selectively interconnected so that fluid or moisture from one compartment is conveyed to a second food compartment containing a moisture absorbing food product. Other variations utilize fluid and grease flow passages between compartments that prevent or inhibit clogging by fluids or grease passing from a food cooking compartment to a trap compartment, or provide flow passages for mixing ingredients of a sauce, dressing, gravy or other like food enhancement material to a main food product, whether cooked or not cooked.

To this end, in an embodiment of the present invention, an apparatus is provided. The apparatus may comprise a first chamber having a shape, a second chamber having a shape, and a channel between the first chamber and the second chamber for draining fluids from a cooked food product in the first chamber to the second chamber, and/or introducing ingredients from the second chamber to the first chamber.

In an embodiment, the first chamber, the second chamber, and the channel between the first chamber and the second chamber are formed by a seal extending from a first end of the apparatus and terminating at a point a length away from a second end of the apparatus.

In an embodiment, the first chamber, the second chamber, and the channel between the first chamber and the second chamber are formed by a first seal extending from a first end of the apparatus and terminating at a first point, and a second seal extending from a second end of the apparatus and terminating at a second point, wherein the first point is a length away from the second point.

In an embodiment, the first chamber, the second chamber, and the channel between the first chamber and the second chamber are formed by a first seal extending from a first end of the apparatus and terminating at a first point, a second seal extending from a second end of the apparatus and terminating at a second point, and a perforated seal connecting the first point and the second point.

In an embodiment, the first chamber, the second chamber, and the channel between the first chamber and the second chamber are formed by a perforated seal extending a length from a first end of the apparatus.

In an embodiment, the first chamber, the second chamber, and the channel between the first chamber and the second chamber are formed by a first seal extending from a first end of the apparatus and terminating at a first point and a second seal extending from the first point and terminating at a second end of the apparatus, wherein the second seal is re-sealable.

In an embodiment, the first chamber, the second chamber, and the channel between the first chamber and the second chamber are formed by vertical seals, each of the vertical seals extending from a first point and terminating at a second point, aligned in a parallel fashion.

In an embodiment, at least one of the first and second chambers comprises a gusset.

In an embodiment the apparatus comprises a material selected from the group consisting of a conductor, a susceptor, an insulator, a reflector, and any combination thereof.

In an embodiment, the apparatus comprising a valve from releasing pressure from within the apparatus.

In an embodiment, the apparatus comprises a first chamber having a shape, a third chamber having a shape, and a channel between the first chamber and the third chamber.

In an embodiment, the apparatus comprises a first chamber having a shape, a second chamber having a shape, a third chamber having a shape, and a channel between the second chamber and the third chamber.

An embodiment, the apparatus comprises a first chamber having a shape, a second chamber having a shape, a third chamber having a shape, a channel between the second chamber and the third chamber, and a channel between the first chamber and the third chamber.

In an embodiment, the first chamber, the second chamber, and the channel between the first chamber and the second chamber are formed by a first seal extending from a first end of the apparatus and terminating at a first point, a second seal extending from a second end of the apparatus and terminating at a second point, wherein the first point is a length away from the second point; the third chamber and the channel between the second chamber and the third chamber are formed by a third seal extending from the second point and terminating at a third point a length away from a third end of the apparatus.

In an alternate embodiment of the present invention, an apparatus comprises a first chamber having a shape, a second chamber having a shape, a third chamber having a shape, a fourth chamber having a shape, wherein the fourth chamber is independent of the first, second, and third chamber.

In an alternate embodiment of the present invention, a method for preparing food is provided. The method comprises utilizing a multi-chamber food product bag, and comprises the steps of providing a food product bag, wherein the food product bag comprises a first chamber having a shape and a second chamber having a shape, wherein a channel is formed between the first chamber and the second chamber, filling a first chamber with a first food product, and sealing the first chamber.

In an embodiment, the method further comprises the steps of sealing the second chamber, cooking the first food product within the first chamber to form a cooked food product and food byproducts, moving the food byproducts into the second chamber through the channel, opening the first chamber and removing the cooked food product, and disposing of the food product bag and the byproducts.

In an embodiment, the method further comprises the steps of filling a second chamber with a second food product and sealing the second chamber cooking the first food product within the first chamber to form a cooked food product and food byproduct, moving the food byproducts into the second chamber through the channel, mixing the food byproducts with the second food product in the second chamber to form a mixture, opening the first chamber and removing the cooked food product, and opening the second chamber and removing the mixture.

In an embodiment, the method further comprises filling a second chamber with a second food product and sealing the second chamber, wherein the channel is sealed with a releasable seal; opening the releasable seal and introducing the second food product into the first chamber through the channel, mixing the first food product and the second food product to form a mixture, opening the food product bag, and removing the food product mixture.

In an embodiment, the method further comprises filling a second chamber with a second food product and sealing the second chamber, wherein the channel is sealed with a releasable seal, cooking the first food product within the first chamber, opening the releasable seal and introducing the second food product into the first chamber through the channel, mixing the first food product and the second food product to form a mixture, opening the food product bag, and removing the food product mixture.

With the desire of many present day consumers to increase the speed and ease of cooking while minimizing the effort required for kitchen and utensil cleanup, the present invention provides a unique food cooking package whose basic concept may be configured, partitioned, shaped, and modified to satisfy the needs of the three major segments of the food industry: Food manufacturers such as frozen and fresh foods producers; the food service industry such as restaurants and other industrial feeders; and the retail consumer products industry in the form of packages or bags that can be filled with food by the consumer at home or by the supermarket in areas like the deli, fresh meat and seafood, pre-prepared foods, or other store areas. The present invention addresses these needs by providing a food cooking package having a grease trap compartment and that is easily disposable, provides a non-messy package which facilitates microwave, conventional oven, stove top or boiler cooking of meat, fish, and other food products, and eliminates unpleasant kitchen odors associated with cooking odor producing food products such as fish.

Moreover, the food cooking package of the present invention facilitates, for example, rapid poaching of fresh or frozen fish and other food products. Other features include the ability to retain moisture in cooked fish, meat, and other foods to thereby provide a juicy eating experience for the cooked foods. The food cooking package enables, for example, cooking of bacon and other meats and protein based foods without the need for added oil. It also facilitates pre-packaging of raw, refrigerated, frozen and fully cooked meat and other foods and thereby eliminates a source of potential product contamination as well as the need for consumers to touch raw food, a significant problem for many consumers. The food cooking package of the present invention provides simpler and cleaner food preparation, cooking or warming for pre-cooked foods, and clean up, thereby minimizing post product packaging contamination as well as eliminating the need to wash pots and pans.

The subject invention further provides food packaging options that may be used to package raw, refrigerated, frozen or fully cooked meat, fish, poultry, pork, seafood or other food products. The packaging options include cooking bags that a consumer could purchase to prepare meat, fish, poultry, pork seafood or other food products. The cooking bags or packages are made of material compatible with microwave cooking, conventional oven cooking, boiling and stove top cooking and have a series of sealed seams which define internal selectively interconnected cavities or compartments that allow grease and moisture to be trapped after cooking, making it easy and neat for the consumer to eliminate the grease and moisture while saving the finished cooked meat/seafood product.

The cooking bags or packages may vary in size and shape depending on desired application and may be made of plastic, polyester, polymerized vinyl chloride or vinylidene chloride with monomers such as acrylic esters and unsaturated carboxyl groups, mixtures of polymers, copolymers with various orientations, or other suitable food-safe packaging materials with varying moisture, vapor, and gas transfer characteristics compatible with microwave, conventional oven, stove top and boiler cooking techniques. The cooking bags, which may be made from roll stock, have sealable openings to facilitate insertion and removal of food products and may include, without limitation, conductors, susceptors, reflectors, insulators, valves or other functional and nonfunctional configurations that enhance the cooking process. The sealable openings may be sealed with a variety of closure techniques such as heat sealing, impulse sealing, tear strips and suitable releasable fluid tight rib/channel connections.

Still further, it is an objective and advantage of the present invention to provide apparatus, systems and methods for providing separate compartments for ingredients in a mixture, such as ingredients for a sauce, dressing, or other like mixture, for fresh and/or uncooked food products, such as vegetables or the like, wherein the ingredients can be mixed together to form a mixed product.

Further objects, features and advantages of the invention will become apparent from the following description taken with the accompanying drawings wherein like reference numbers represent like elements throughout the several views. While the present invention is susceptible of embodiments in various forms, there is shown in the drawings presently preferred embodiments. It will be understood that the present disclosure is to be considered as an exemplification of the invention, and is not intended to limit the invention to the specific embodiments illustrated and described.

BRIEF DESCRIPTION OF THE DRAWINGS

The drawing figures depict one or more implementations in accord with the present embodiments, by way of example only, not by way of limitations. In the figures, like reference numerals refer to the same or similar elements.

DETAILED DESCRIPTION OF THE PRESENTLY PREFERRED EMBODIMENTS

Figure 1:
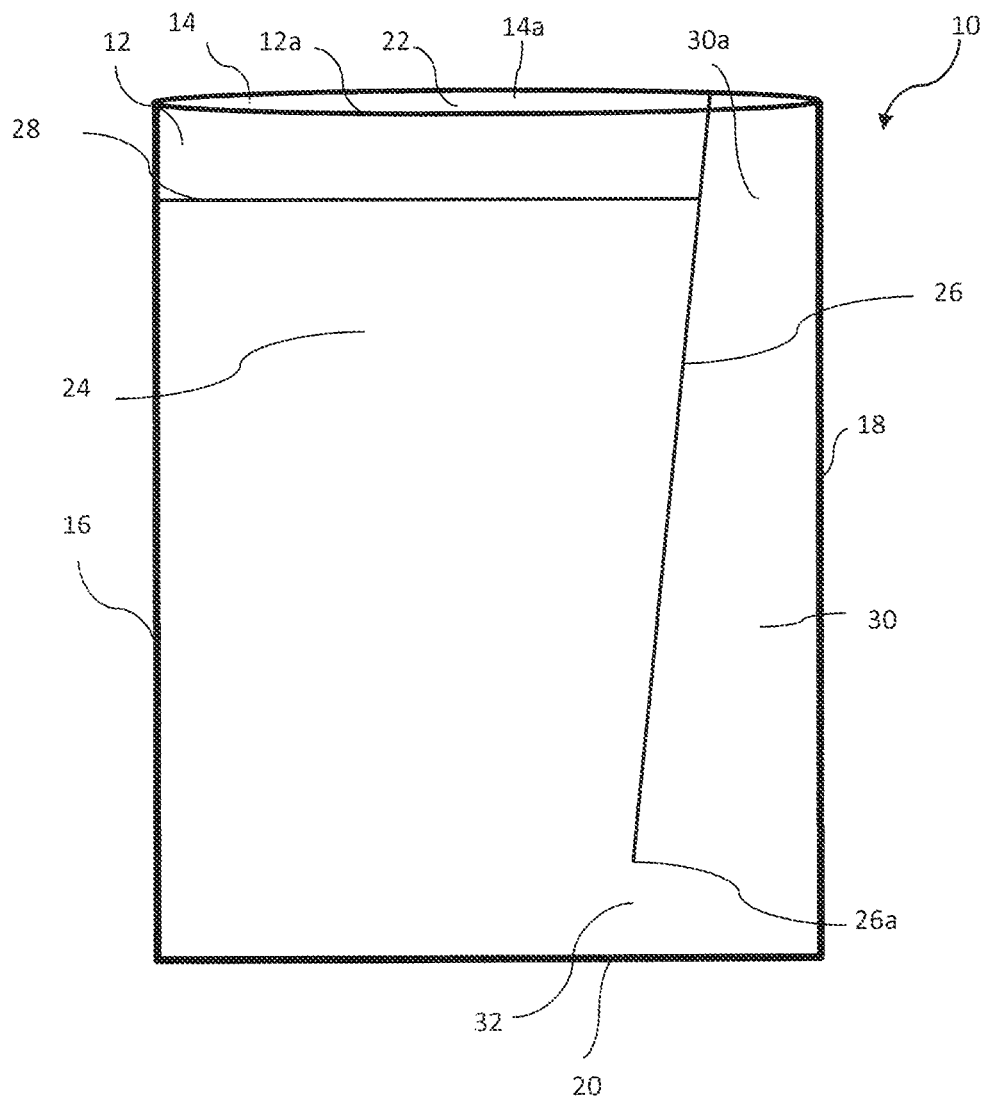
FIG. 1 illustrates a food package apparatus having a compartment for collecting and/or channeling grease and/or other fluids from a cooked food product, in an embodiment of the present invention.

The present invention relates to an invention in food packaging that is particularly adapted for microwave, conventional oven, stove top and boiler cooking techniques and includes an integral pocket or trap compartment for receiving fluids created by the cooking process, such as grease. Variations of the invention facilitate removal of the trapped fluid and grease after completion of the cooking process, enable retention of the trapped fluids and grease and disposal of the package with the trapped fluids and grease retained therein, provide interconnected food and trap compartments so that fluids of different densities derived from the cooked food are separated into separate trap compartments, and provide a plurality of food compartments selectively interconnected so that fluid or moisture from one compartment is conveyed to a second food compartment containing a moisture absorbing food product. Other variations utilize fluid and grease flow passages between compartments that prevent or inhibit clogging by fluids or grease passing from a food cooking compartment to a trap compartment, or provide flow passages for mixing ingredients of a sauce, dressing, gravy or other like food enhancement material to a main food product, whether cooked or not cooked.

Referring now to the drawings, and in particular to FIGS. 1 and 2A-2C, a first embodiment of a package for cooking food products in accordance with the present invention is indicated generally at 10. The food package 10, which may alternatively be termed a food cooking bag having an integral grease trap compartment, has a generally rectangular plan configuration as considered in the plane of FIG. 1. The food cooking package 10 is formed, preferably, from roll stock and may comprise two generally rectangular sheets of a suitable food-safe material such as a polymeric plastic film, such as, but not limited to, polyester, polymerized vinyl chloride or vinylidene chloride with monomers such as acrylic esters and unsaturated carboxyl groups, mixtures of polymers, copolymers with various orientations, or other suitable food-safe packaging materials that are compatible with cooking by microwave ovens, conventional electric or gas ovens, stove top cooking and boiling, and may have varying moisture, vapor, and gas transfer characteristics, and may be utilized to provide heat seals in discrete locations. The plastic films utilized in the food packaging of the present invention may be from laminated roll-stock sources, blown plastic sources, or any other source of plastic film apparent to one of ordinary skill in the art. Thus, the packages described therein may be panels that are sealed together on their peripheries, or blown bags that may not require seals along sides thereof, but across tops and bottoms, or any other configurations apparent to one of ordinary skill in the art to provide internal compartments for the placement and cooking of food products, as described below.

In the illustrated embodiment, two rectangular juxtaposed sheets of food-safe material 12 and 14 are secured in sealed relation along mating longitudinal marginal edges so as to form closed sealed longitudinal marginal seams 16 and 18 which intersect a similarly sealed transverse lower edge 20. The mating longitudinal marginal edges and transverse lower edges of sheets 12 and 14 may be suitably secured as by heat sealing or by a suitable food and heat compatible adhesive interposed between the mating marginal edges.

In the embodiment illustrated in FIG. 1, the upper marginal edges 12a and 14a of the sheets 12 and 14 are not secured together and thereby define a transverse access opening 22 enabling the introduction of a food product into the food package 10. The interior of the food package 10 is divided into a food receiving compartment 24 and a grease trap compartment 30. The food receiving compartment is bounded by the longitudinal marginal edge 16, the lower transverse edge or seam 20, a seal line seam 26 that extends from the upper marginal edges 12a and 14a toward the bottom transverse edge 20 but terminates short of the bottom transverse edge, and a transverse seal 28 that closes the upper end of the food compartment and is formed after insertion of a food product into the food compartment.

The seal line 26 is preferably angularly inclined relative to the longitudinal marginal edge 18 of the food package 10 and cooperates with the longitudinal marginal edge 18 to define the grease trap compartment 30 which is open or may be sealed at its upper end 30a and increases in transverse width toward bottom end of the seam 26. The seals 26 and 28 may also be formed by suitable heat sealing with the transverse seal 28 being formed after a food product is inserted into the food receiving compartment 24. The food package 10 is primarily intended for use by consumers in their homes to prepare food products by microwave, conventional oven, stove top or boiling cooking techniques. In lieu of heat sealing to close the upper end of the food compartment, the seal 28 may be formed by a suitable liquid impervious seal of the rib/channel type wherein a transverse rib is formed on the inner surface of one of the sheets 12 or 14 and is sized and positioned to be releasably inserted into a suitably configured transverse channel formed in the inner surface of the opposing or opposite sheet 12 or 14 so that after introducing a food product into the compartment 24, the consumer can manually seal the food compartment along the seal 28.

Figure 2A:
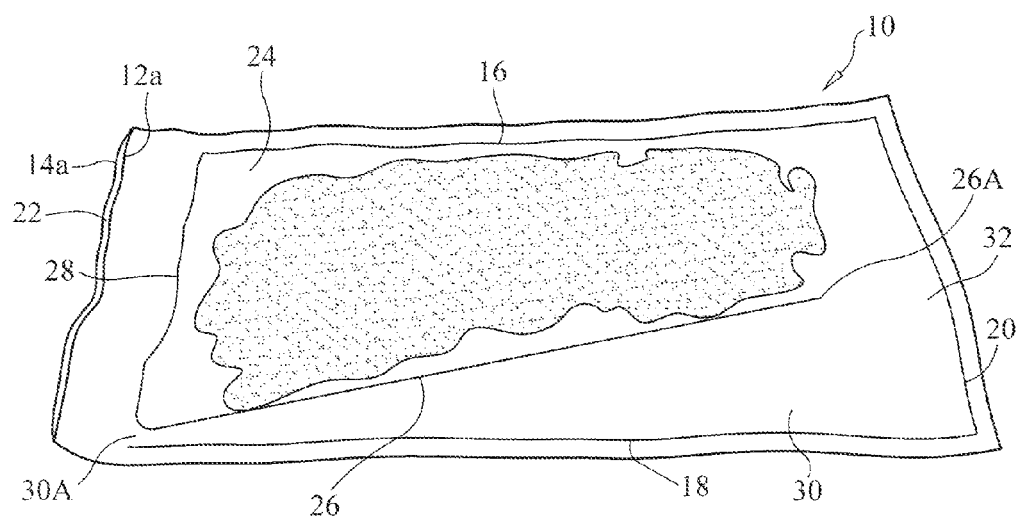
FIGS. 2A-2C illustrate an exemplary food package apparatus having a compartment for collecting and/or channeling grease and/or other fluids from a cooked food product, in an embodiment of the present invention.
Figure 2B:
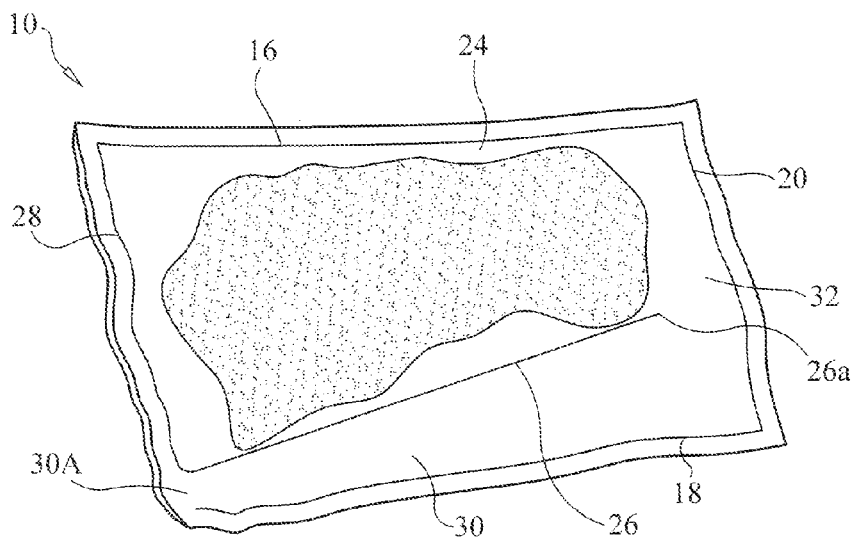
Figure 2C:
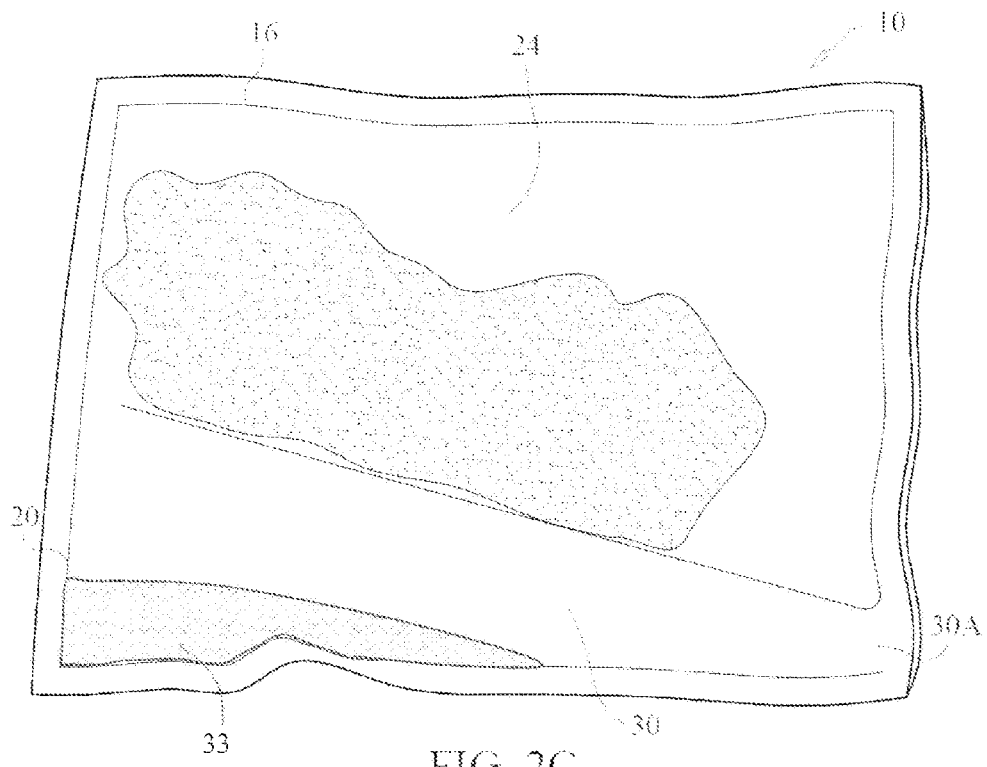

As noted, the seal seam 26 is formed so that its lowermost end 26a is spaced from the lower transverse edge seam 20 so as to establish an open passage 32 between the food receiving compartment 24 and the grease trap compartment 30. FIGS. 2A-2C illustrate the food package 10 having a food product, such as ground beef, inserted within the food receiving compartment 24 after which the seal 28 is formed. After the ground beef is cooked, the food package 10 is oriented so that any fat or grease will drain from the food compartment through the opening 32 into the grease trap compartment 30. The food package can then be rotated such that grease 33 accumulated in the grease trap compartment 30 is discharged through the open distal end 30a of the grease trap compartment as illustrated in FIG. 2C. It will be appreciated that depending upon the extent of grease trapped in the grease trap compartment, it may be desirable to pour off the accumulated grease prior to removing the cooked food product by slitting or otherwise opening the sealed seam 28. It may be desirable during the cooking process to vent the cooking compartment by cutting off a corner portion of the upper end of the food package, or piercing the cooking compartment near its entry end, so as to create an air vent preferably adjacent the intersection of the seal 28 and the longitudinal marginal edge seam 16. In an alternate embodiment, a valve may be placed in a location to provide an egress for accumulated steam or other gases that may be formed during the cooking process, and/or that may prevent the entry of gas from the ambient air.

Figure 3B:
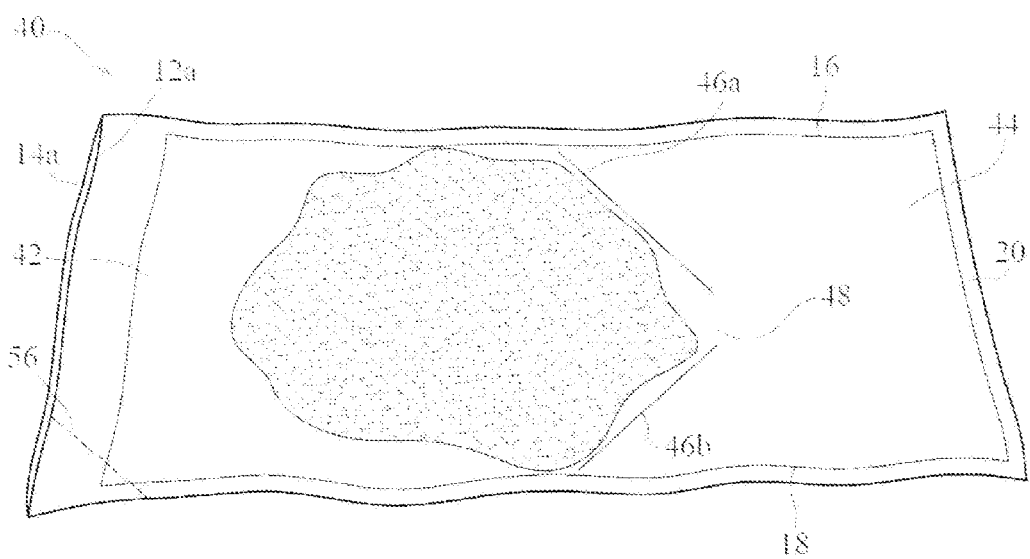
FIG. 3A-3B illustrate a food package apparatus and exemplary embodiment thereof having a moisture drain compartment for collecting grease, oils and/or other fluids from cooked food products, in an embodiment of the present invention.
Figure 3A:
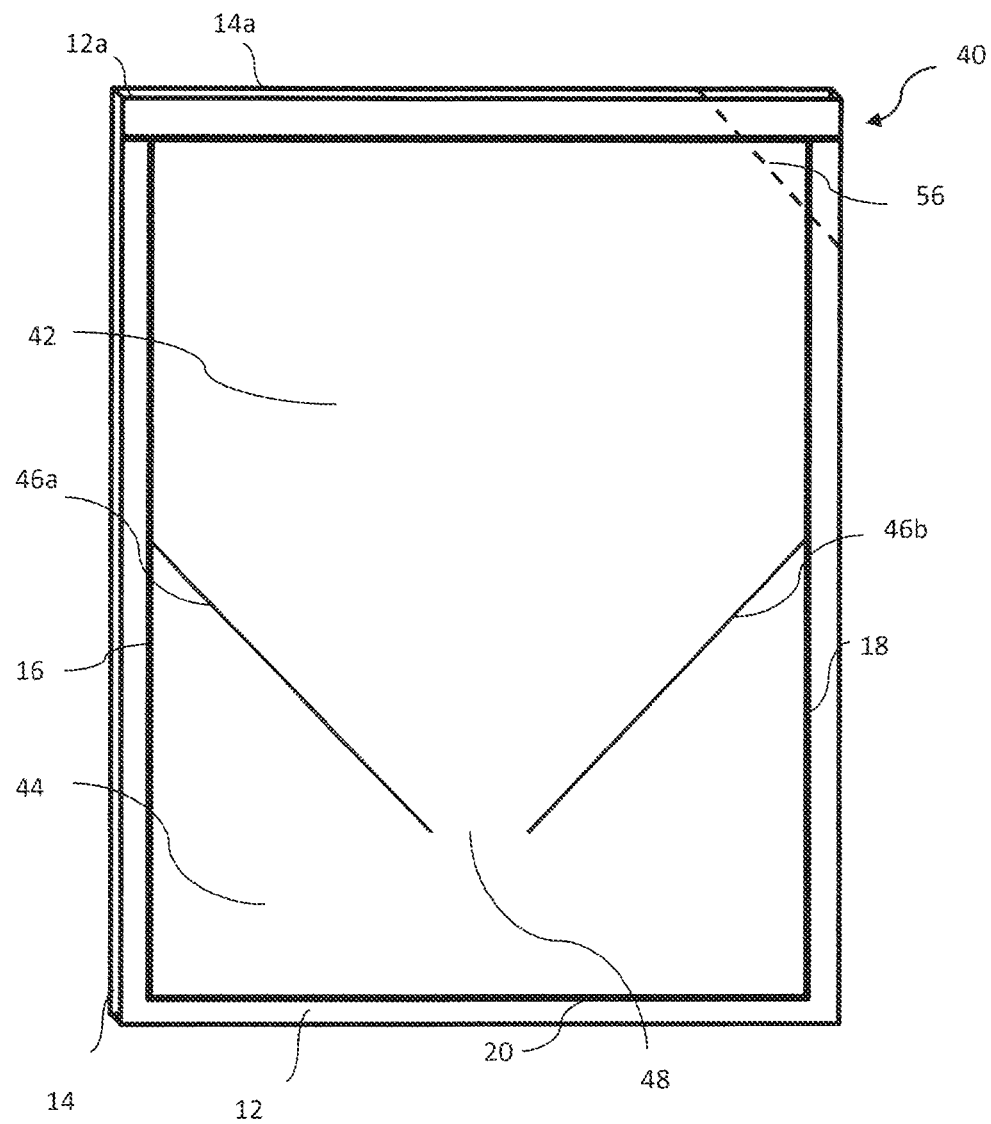

FIGS. 3A and 3B illustrate an alternative embodiment of a food cooking package, indicated generally at 40, for microwave, conventional oven, stove top or boiling cooking of a food product. The food cooking package 40 is generally similar to the aforedescribed food cooking package 10 but is designed to trap the cooked grease in the food package so that it may neatly and easily be disposed of into a garbage or waste receptacle. In this respect, the food cooking package 40 is similarly formed as a generally rectangular cooking package defined by rectangular sheets of the material 12 and 14 secured along their longitudinal marginal edges 16 and 18 and their lower transverse marginal edge 20 to create an interior food receiving compartment 42 and a grease trap compartment 44. In the embodiment illustrated in FIG. 3A, the food receiving compartment 42 is separated from the grease trap compartment 44 by a pair of inclined seal seams 46a and 46b that are spaced at their lower ends to establish an opening 48 which serves as a drain passage for grease and other fluids that may be created during cooking of the food product. The angle of incline of the sealed seams 46a and 46b relative to the respective marginal edges 16 and 18 may be varied and preferably each sealed seam forms an included angle of approximately 30-50° with its adjacent corresponding longitudinal marginal edge 16 or 18, respectively.

The rectangular sheets 12 and 14 of microwaveable, conventional oven and boiler compatible material utilized in the food package 40 have upper transverse marginal edges 12a and 14a which are initially open or free to provide an access opening for introducing a food product into the food receiving compartment 42. The marginal edges 12a,14a are then sealed together by a heat seal, the aforedescribed rib/channel closure means or a suitable cooking heat compatible mechanical sealing device to thus seal the food product within the food receiving compartment. During cooking of a food product within the food package 40, a corner of the food package or bag may be slit, such as along the dash-line 56, to allow venting of the food compartment, or one or more valves may be utilized to provide venting of the food compartment.

FIG. 3B illustrates the food cooking package 40 in a generally horizontal orientation with a food product, such as ground beef, disposed in the cooking compartment. After cooking the ground beef, the food package is held upright to cause grease to drain into the lower grease trap compartment 44 while the meat is retained in the upper food cooking compartment 42. The upper sealed marginal edges 12a and 14a of the food package are then opened or severed and the cooked meat or other food product removed as by discharging it onto a counter or other receptacle. The package is then placed in a trash receptacle or the like with the trapped grease retained within the grease trap compartment.

As an alternative use of the food cooking package 40, and particularly when cooking a lean meat or other savory juice producing food product, a vegetable, starch, rice or other food component that will benefit from drippings created by the lean meat or other savory juice producing food product may be inserted into the trap compartment 44 through the appropriate sized opening 48, or a sealable opening (not shown) providing direct access into the trap compartment, after which the lean meat or other juice producing food product is inserted into the food cooking compartment 42. After cooking the food product and proper orientation of the food package, the drippings will flow into the trap compartment 44 and mix with the vegetable, starch, rice other food component and any sauce or gravy flavoring and thickening components that are inserted into the compartment 44. In this fashion, the meat drippings may be used to produce fresh gravies and sauces or add flavor to other food components introduced into the trap compartment 44.

Figure 4:
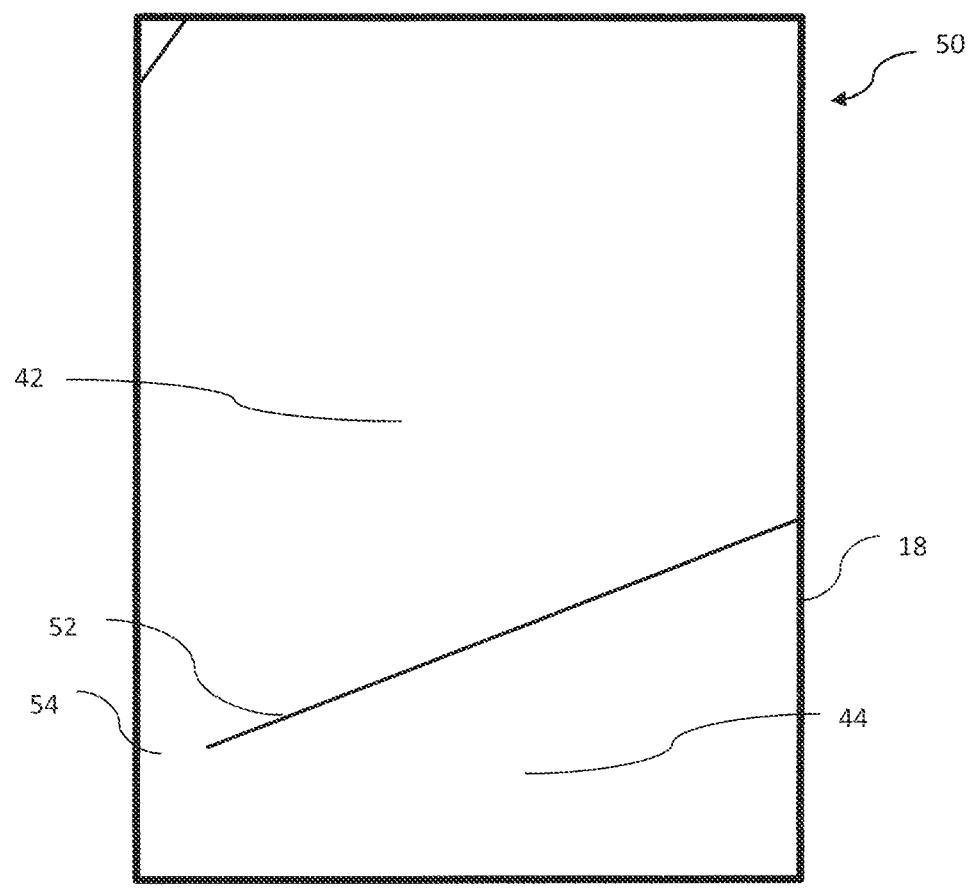
FIG. 4 illustrates an alternate food package apparatus for cooking food products and collecting greases, oils and/or other fluids, in an embodiment of the present invention.

FIG. 4 illustrates another embodiment of a food cooking package, indicated generally at 50, that is similar to the food cooking package 40 but utilizes a single inclined sealed seam 52 to separate a food cooking compartment 42 from a grease trap compartment 44. The seal 52 is preferably angularly inclined relative to the longitudinal marginal edge 18 of the food cooking package so as to create a grease passage 54. In other respects, the food cooking package 50 is substantially the same as the food package 40 and serves as a disposable food package cooking the food product inserted into the food receiving compartment 42 and passing any grease into the grease trap compartment 44.

Figure 5:
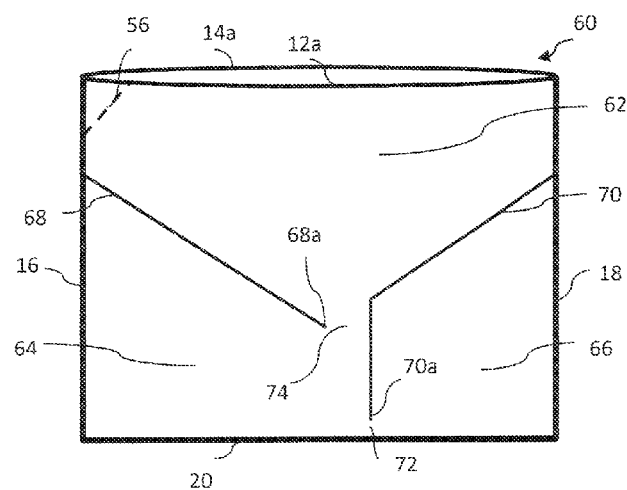
FIG. 5 illustrates a further alternate food package apparatus for cooking food products, and collecting and separating greases, oils, water and/or other fluids, in an embodiment of the present invention.

FIG. 5 illustrates another embodiment of a food cooking package, indicated generally at 60, which is made from a materials similar to the material used in the food cooking packages 10, 40 and 50, and heat sealed or otherwise suitably secured along longitudinal marginal edges 16 and 18 and along a lower transverse marginal edge 20 similar to the aforedescribed food packages 10, 40 and 50. The food cooking package 60 is formed with a food receiving and cooking compartment 62 and a pair of fluid receiving trap compartments 64 and 66. The trap compartment 64 is separated from the food cooking compartment 62 by a sealed seam 68 which preferably is inclined downwardly relative to the longitudinal marginal edge 16 and transverse bottom edge 20 so as to substantially separate the trap compartment from the food receiving compartment 62. The second trap compartment 66 is formed by a sealed seam 70 that substantially separates the second trap compartment 66 from the food compartment 62 and also substantially separates the trap compartment 66 from the trap compartment 64. A lowermost end 70a of the sealed seam 70 terminates at a point spaced from the lower marginal edge 20 of the food package so as to define an opening or passage 72 between the two trap compartments 64 and 66. The inner end 68a of the sealed seam 68 is spaced from the seam 70 so as to define a fluid passage 74 between the trap compartment 64 and food compartment 62. An air vent opening for the food cooking compartment 62 may be formed by severing an upper corner edge of the package 60, as along dash line 56.

In use of the food cooking package 60, a food product is inserted into the food compartment 62 and the upper marginal edges 12a and 14a are sealed closed as by a heat sealed seam, the aforedescribed rib/channel seal or a compatible mechanical closure sealing device so as to substantially close the food compartment. After cooking the food product, the food package or bag 60 is oriented in a generally vertical orientation so that any water and oil soluble fluid components created by the cooked food product pass through the opening 74 into the trap compartment 64. The water component of the fluid that passes into the trap compartment 64 may then be forced by gravity through the opening 72 into the trap compartment 66 with the oil component remaining in the trap compartment 64 when the package 60 may be suitably tilted or rotated. As an alternative, the compartment 66 may be modified to enable insertion of a dry sauce, gravy or flavor component, or a combination thereof, such that after cooking of the food product, the heavier density water from the water and oil soluble components in the trap compartment 64 created by the cooked food product passes through the opening 72 and mixes with the dry sauce/gravy/flavor components in compartment 66 to create a fresh sauce or gravy.

Figure 6:
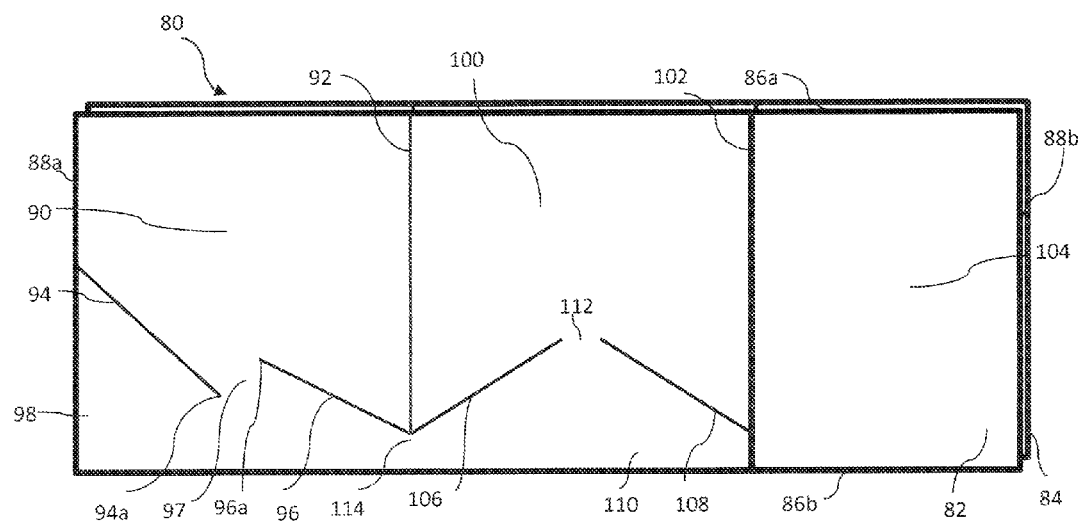
FIG. 6 illustrates a food package apparatus having multiple compartments for cooking a plurality of food products therein, and for separating and channeling greases, oils and/or other fluids from a first food product to a second food product, in an embodiment of the present invention.

FIG. 6 illustrates another embodiment of a food cooking package, indicated generally at 80, in accordance with the invention and that employs a pair of generally rectangular sheets 82 and 84 that are preferably made of substantially the same material as the aforedescribed rectangular sheets 12 and 14 in the food cooking packages 10 and 50. The juxtaposed sheets 82 and 84 form side panels of the food cooking package 80 and are secured to each other along their mutually opposed peripheral edges by heat sealing or a food and heat compatible adhesive so as to form upper and lower edge seams 86a and 86b and laterally spaced edge seams 88a and 88b.

In the illustrated embodiment, the food cooking package 80 has a food receiving and cooking compartment 90 defined between the end seal edge 88a and a sealed seam 92 disposed substantially parallel to the edge seam 88a and affixing the sheets 82 and 84 along the seam 92. A pair of downwardly inclined seal lines 94 and 96 establish a lower boundary of the food receiving and cooking chamber 90 and separate the food chamber from a trap compartment 98 disposed below the food receiving and cooking chamber when the package 80 is disposed in a generally vertical orientation as illustrated in the plane of FIG. 6. The seal lines 94 and 96 intersect, respectively, the lateral edge seam 88a and the divider sealed seam 92 and have inner ends 94a and 96a, respectively, which are spaced apart and define a flow passage 97 from the food compartment 90 into the grease and moisture receiving compartment 98.

The food cooking package 80 has a second food receiving compartment 100 that is defined between the seal seam 92 and a similar seal seam 102 that extends between the upper and lower margins 86a and 86b of the food package and establishes a third food compartment 104 that may be isolated from the food compartments 90 and 100. A pair of upwardly inclined seal lines 106 and 108 that seal the sheets 82 and 84 along the seal lines 106, 108 are formed so as to establish a lower boundary for the food compartment and also establish an upper boundary for a trap compartment 110. The uppermost ends of the seal lines 106 and 108 are spaced apart to define a passage 112 that enables communication between the second food compartment 100 and the trap compartment 110, and thereby also communication with the trap compartment 98 through an opening passage 114 formed at the lower end of the seal seam 92.

In use, a first food product, such as meat, may be placed within the food chamber 90 through the upper marginal edge 86a prior to sealing of the upper marginal edge 86a. A second food product, such as a vegetable or starch that is moisture absorbing, is inserted into the second food compartment 100 through the upper marginal edge of the package prior to sealing the upper marginal edge 86a. A third food component, that is fully independent of the food products placed within the food compartments 90 and 100, is placed within the food compartment 104 also through and between the upper marginal edges of the sheets prior to sealing them together. The food package 80 with food products thus inserted within the food compartments 90, 100 and 104 is then placed in a suitable cooking facility, such as a microwave oven, a conventional oven, a boiler, or stove top cooking facility and the food products in all three food compartments cooked. When the food products have been sufficiently heated and cooked, the food package 80 is removed from the heating or cooking facility and the package tilted so that juices and any grease flows from the food compartment 90 into the grease trap compartment 98. The food package is then reoriented so that the drippings flow through the passage 114 into the compartment 110 with further orientation of the package causing the drippings to pass into the food compartment 100 for absorption by the food within food compartment 100. At this point the food package can be returned to the microwave or other heating facility to further cook the food in compartment 100 after absorption of moisture from the food compartment 90 or may be removed for consumption. The food within food compartment 104 may be independently heated and the food within each of the food compartments is removed by severing the package generally adjacent the upper sealed marginal edge 86a. Any grease in the grease trap compartment 98 may be disposed of with the used food package 80.

Figure 7:
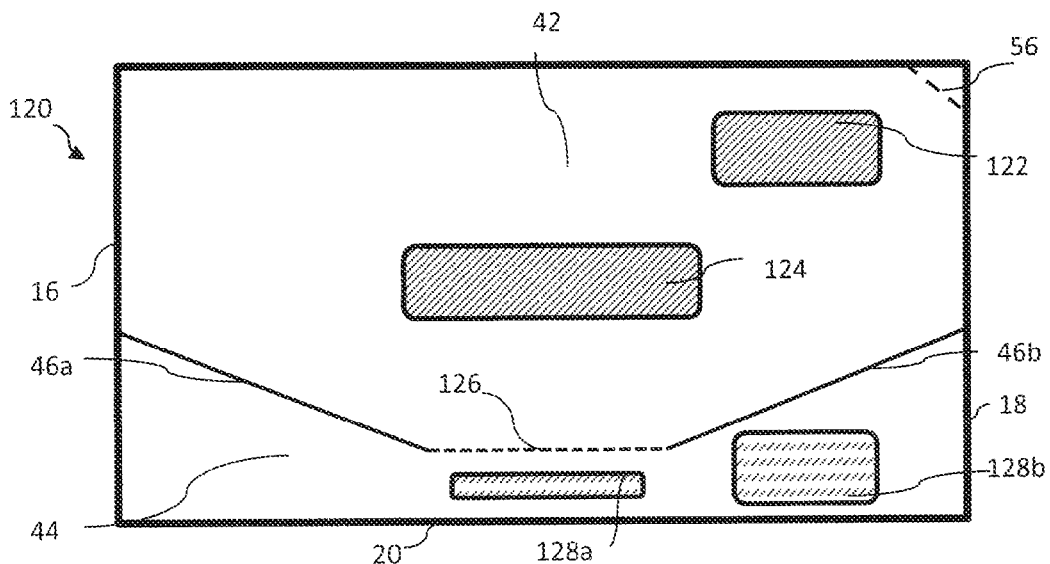
FIG. 7 illustrates a food package apparatus having a plurality of functional components, including receptors, reflectors and/or susceptors, in an embodiment of the present invention.

FIG. 7 illustrates another embodiment of a food cooking package, indicated generally at 120, in accordance with the present invention and is generally similar to aforedescribed food cooking package 40 so that common reference numerals designate like elements in both FIGS. 3 and 7. In this respect, the food cooking package 120 has a food receiving compartment 42 and a grease trap compartment 44 defined by inclined seal seams 46a and 46b so that the grease trap compartment is disposed below the food receiving and cooking compartment 42. In the embodiment illustrated in FIG. 7, strategically placed susceptor material members, indicated schematically at 122 and 124, are positioned within the food cooking compartment 42 to preferentially assist in heating all or portions of food product introduced into the food receiving and cooking compartment 42. An interrupted heat, impulse or other seal means 126 is formed between the inner ends of the seal seam lines 46a,46b and serves as a strainer for any grease or juice resulting from cooking of the food product that passes into the grease compartment. Reflector material, indicated schematically at 128a and 128b is strategically placed within the grease compartment to preferentially cool grease or juices received therein from the cooked food product.

Figure 8:
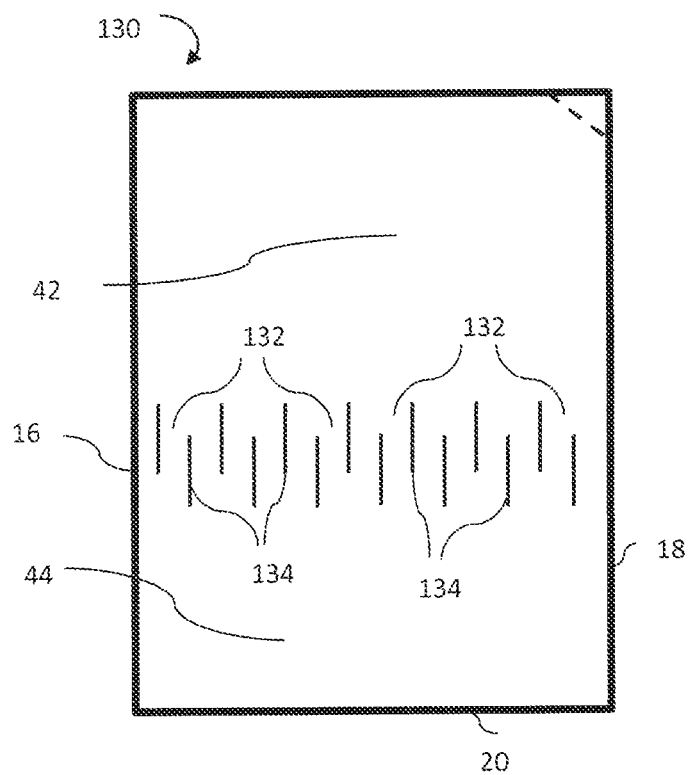
FIG. 8 illustrates a food package apparatus having separate compartments for cooking foods and collecting greases, oils and/or other fluids, and a plurality of channels for channeling the greases, oils and/or other fluids from one compartment to the other without clogging, in an embodiment of the present invention.

FIG. 8 illustrates another embodiment of a food cooking package, indicated generally at 130, in accordance with the present invention and which is substantially similar to the aforedescribed food cooking package 40 illustrated in FIG. 3. Accordingly, similar reference numerals shown on FIG. 8 designate similar components as described in respect to FIG. 3. In short, the food cooking package 130 differs from the food cooking package 40 by separating the grease trap compartment area 44 from the food receiving and cooking compartment 42 by a plurality of spaced vertically disposed channels 132 that are formed by heat or impulse seals designated by a plurality of seal seam lines 134, thus eliminating a single opening or passage between the cooking compartment and the grease trap compartment and substantially preventing clogging that would prevent flow of grease or other juices from the cooked food product into the grease trap compartment.

Figure 9:
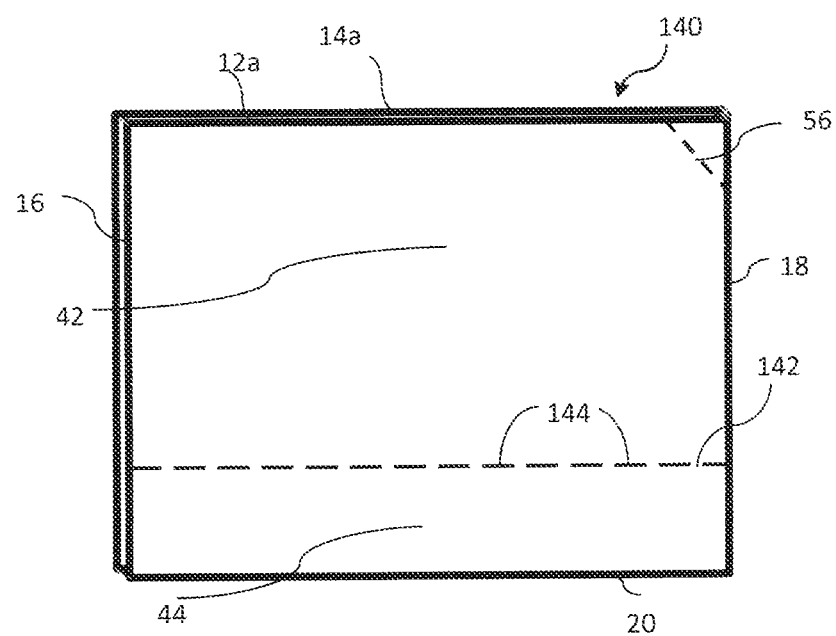
FIG. 9 illustrates an alternate food package apparatus having separate compartments for cooking foods and collecting greases, oils and/or other fluids, and an interrupted seal or plurality of perforations for channeling the greases, oils and other moisture from one compartment to the other without clogging, in an embodiment of the present invention.

FIG. 9 illustrates an alternative embodiment of a food cooking package, indicated generally at 140, that is similar to the food cooking package 130 illustrated in FIG. 8 but employs an interrupted seal means 142 separating the grease trap compartment area 44 from the food cooking compartment 42. The interrupted seal means 142 is formed by a plurality of generally transversely aligned short length spaced impulse heat seals 144 so as to provide a relatively large flow area between the adjacent impulse heat seals disposed across the transverse width of the food cooking package to thus establish multi-exit points or fluid flow points for juice and fat to drip into the grease trap compartment area 44.

As a further alternative, the seal means 142 may be formed as a plurality of spaced impulse seals 144 and a solid length seal aligned with the impulse seals and extending approximately one-half the transverse width of the food cooking package so that a significant number of flow perforations are defined between the interrupted or spaced seals 144 while the solid length seal prevents flow to the grease trap compartment through approximately one-half the transverse width of the cooking package. The perforations are large enough to allow the juice, fat and small particles to pass into the grease trap compartment area but not large enough for pieces of food to pass into the grease trap compartment. The solid line seal serves to prevent escape of grease and juices from the grease trap compartment when the food package is oriented so that the marginal edge 18 is in a generally horizontal orientation and the sealed marginal edges 12a and 14a are in a generally vertical orientation and which, when severed, enable removal of the cooked food product.

Figure 10A:
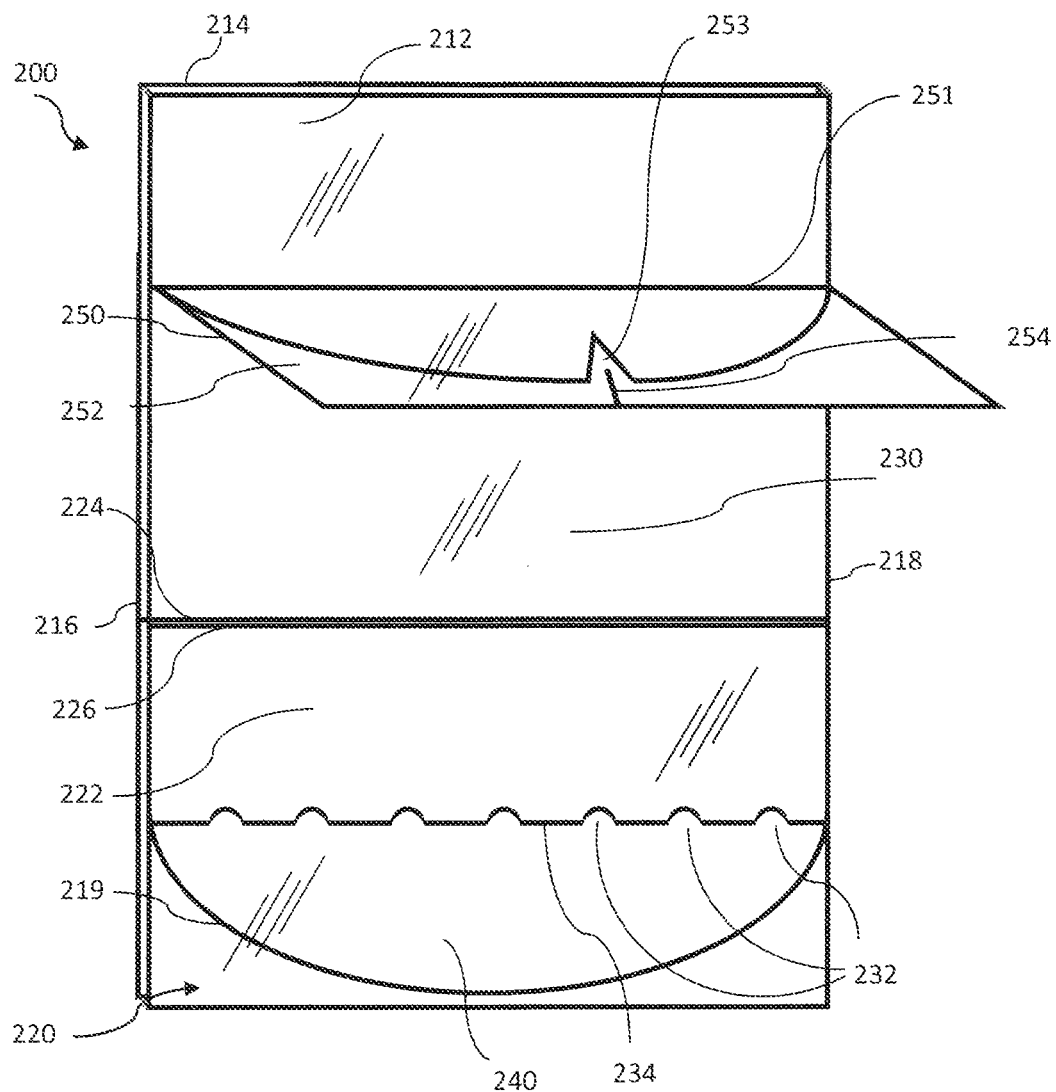
FIGS. 10A-10B illustrate an exemplary embodiment of a food package having separate compartments for cooking foods and collecting greases, oils and/or other fluids, and a gusseted compartment separated from another compartment by a plurality of perforations for channeling the greases, oils, and other moisture.
Figure 10B:
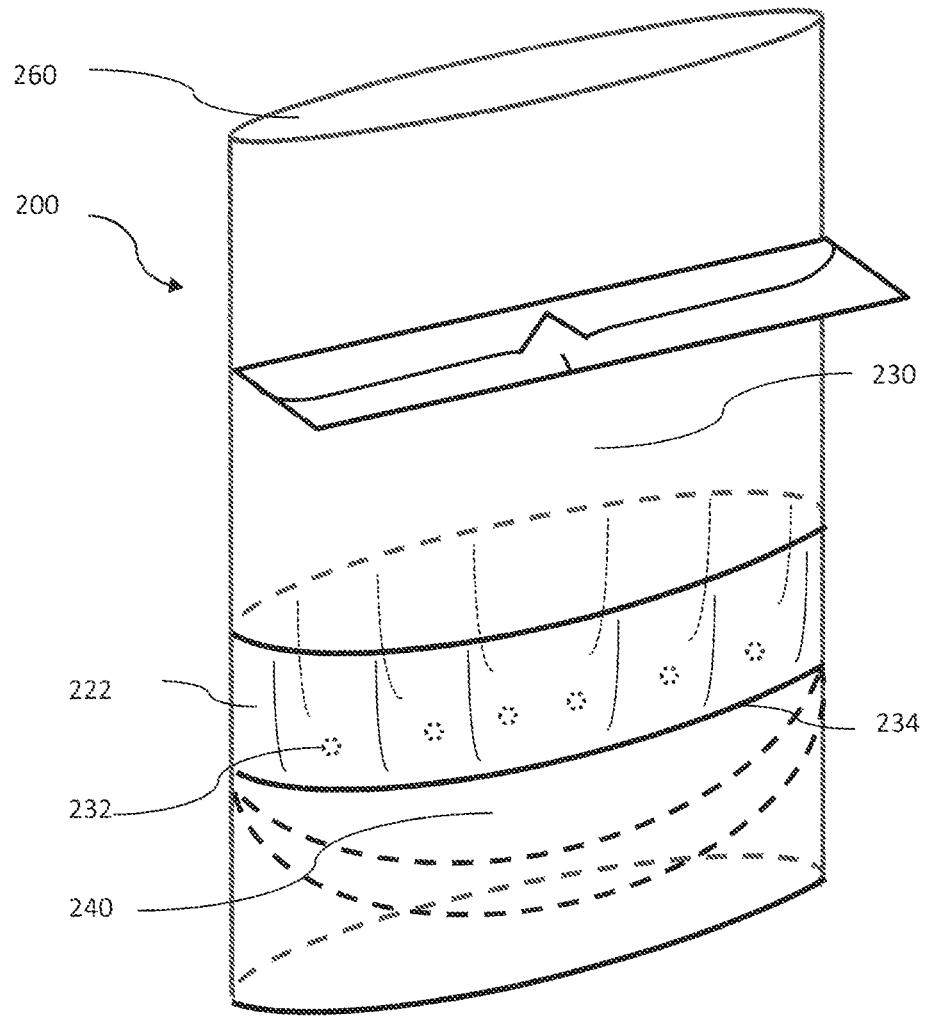

FIGS. 10A and 10B illustrate an exemplary embodiment of the present invention, of food cooking package 200. The food cooking package includes, generally, a first plastic sheet 212 and a second plastic sheet 214 disposed in face-to-face relationship, with heat seals 216, 218 disposed on opposite sides thereof. The bottom of the food cooking package includes a portion having discrete and strategically placed seals 219 to form a gusseted portion 220. Disposed within the food cooking page 200 may be a pocket 222, sealed transversely across the plastic sheets 212, 214 via heat seals 224, 226 so that food for cooking may be placed in a compartment 230, bounded along the bottom thereof the pocket 222. Disposed on the bottom of the pocket 222 may be a plurality of perforations 232 across a folded portion 234 of the pocket 222, the perforation forming channels for the flow of greases, oils and/or other fluids from the compartment 230 therethrough.

Formed beneath the pocket 222 may be a compartment 240 that may be disposed, generally, in the gusseted portion 220 of the food cooking package 200. The gusseted portion 220 may allow the food cooking package to be stood upright while being cooked, to easily drain the greases, oils and/or other fluids from the compartment 230 into the compartment 240 for separation thereof for disposal or for utilizing to make gravies, sauces or for flavorings of other food products.

A flap 250 may be disposed across a top portion of the food cooking package 200 that may consist of a folded over portion having a fold 251 and sealed via heat seals 252 to form the flap 250. Disposed midway across the flap 250 may be a v-shaped seal portion 253 and a slit 254. The flap 250 may provide a handle for the food cooking package 200 so that a user may easily handle the food cooking package 200. The slit 254 in the v-shaped seal 253 may be used as a pressure release valve for use during cooking. A food product may be inserted into the compartment 230 in the food cooking package 200 and the marginal edges of plastic sheets 212, 214 may be sealed together, encasing the food product within the compartment 230. During the cooking process, pressure may build within the food cooking package 200 from the release of steam, expanding the food cooking package 200 towards its maximum capacity. At a certain pressure, the slit 254 in the v-shaped seal 253 may rupture and provide a controlled release of excess pressure from within the food cooking package 200.

FIG. 10B illustrates the exemplary embodiment of the food package 200 standing in an upright configuration with an opening 260 disposed in the upper portion thereof for adding foods to the compartment 230 disposed therein. After adding of the foods to the compartment 230, the opening 260 may be sealed, and the foods contained therein may be cooked with a heat source. FIG. 10B further illustrates the pocket 222 having perforations 232 therein along fold line 234, providing channels for dripping greases, oils and/or other fluids from the compartment 230 to the compartment 240. Of course, the food cooking package 200 may contain other functional components, including conductors, receptors, reflectors, susceptors, valves, venting slits or other functional components described herein.

Figure 11:
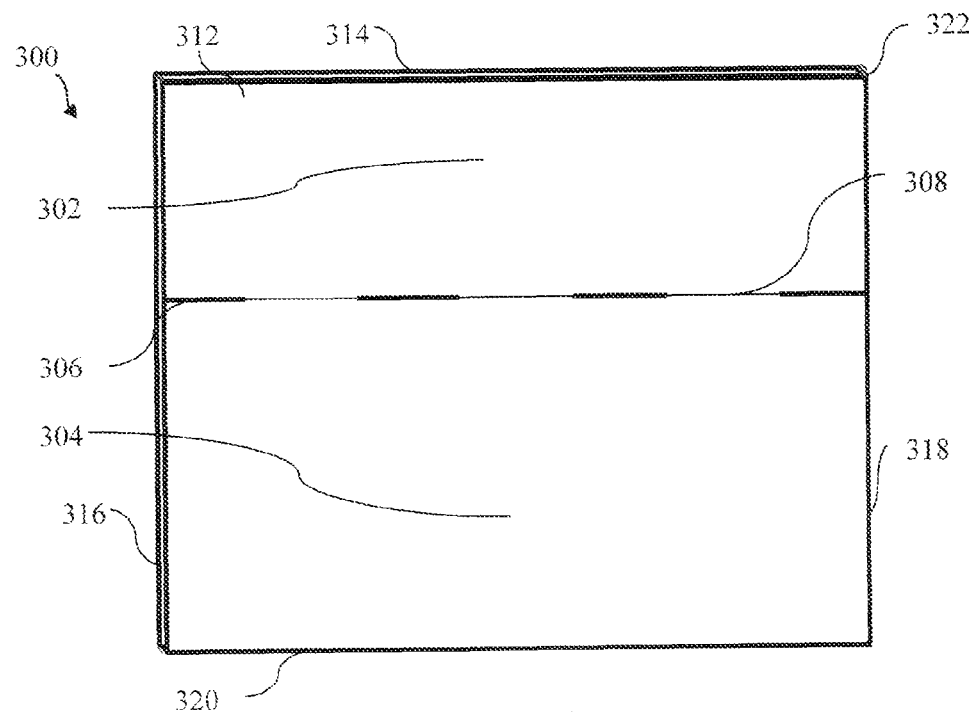
FIG. 11 illustrates a food package having separate compartments for holding food products separately and independently and capable of being mixed together by releasing the seals that divide the compartments.

FIG. 11 illustrates an alternate food package 300 in an embodiment of the present invention. The food package 300 may comprise an upper compartment 302 and a lower compartment 304. Food package 300 may be separated into the upper compartment 302 and the lower compartment 304 by a seal 306. The seal 306 may extend the length of food package 300, interrupted by a plurality of releasable seals 308. The food package 300 may be created from a plurality of sheets 312, 314 that may be bounded by a longitudinal marginal edge 316, a longitudinal marginal edge 318, and both a lower transverse seal 320 that closes the lower compartment 304 and an upper transverse seal 322 that closes the upper compartment 302. The lower transverse seal 320 and/or the upper transverse seal 322 may be formed after insertion of a main food product into the lower compartment 304 and a side food product into the upper compartment 302, respectively.

In examples of use, the upper compartment 302 may be used to house a side food product such as spices, sauces, butters, creams, dressings, seasonings, condiments and/or any other ingredient that may add additional flavor to a main food product. The lower compartment 304 may be used to house a main food product that may be readily combined with the side food product of the upper compartment 302. For example, the lower compartment 304 and the upper compartment 302 may be filled with, respectively, pasta and sauce, macaroni and cheese, vegetables and butter, or mashed potatoes and gravy. The food package 300 may allow combinations as described above to be cooked separately and simultaneously. Alternatively, the lower compartment 304 and the upper compartment 302 may be filled with, respectively, salad and dressing, cereal and milk, or ice cream and chocolate sauce. In this way, the food package 300 may be used without cooking. Additional food combinations known to one skilled in the art may be used in the present invention, and the examples provided herein are not intended to limit the scope of the present invention.

The food package 300 may additionally be used to combine the food product in the upper compartment 302 with the food product in the lower compartment 304 by opening the plurality of releasable seals 308 and allowing the products to mix. Further, the food package 300 may be shaken to mix the combined products to a desired consistency. The plurality of releasable seals 308 may each be opened completely, partially, and/or re-sealed such that the desired amount of the side product from the upper compartment 302 may be mixed with the food product in the lower compartment 304. The plurality of releasable seals 308 may be suitable releasable fluid tight rib/channel connections, such as the seal commonly known as ZIPLOC®, or any other re-sealable method known to one skilled in the art, such that the plurality of releasable seals 308 may both open and close.

Figure 12:
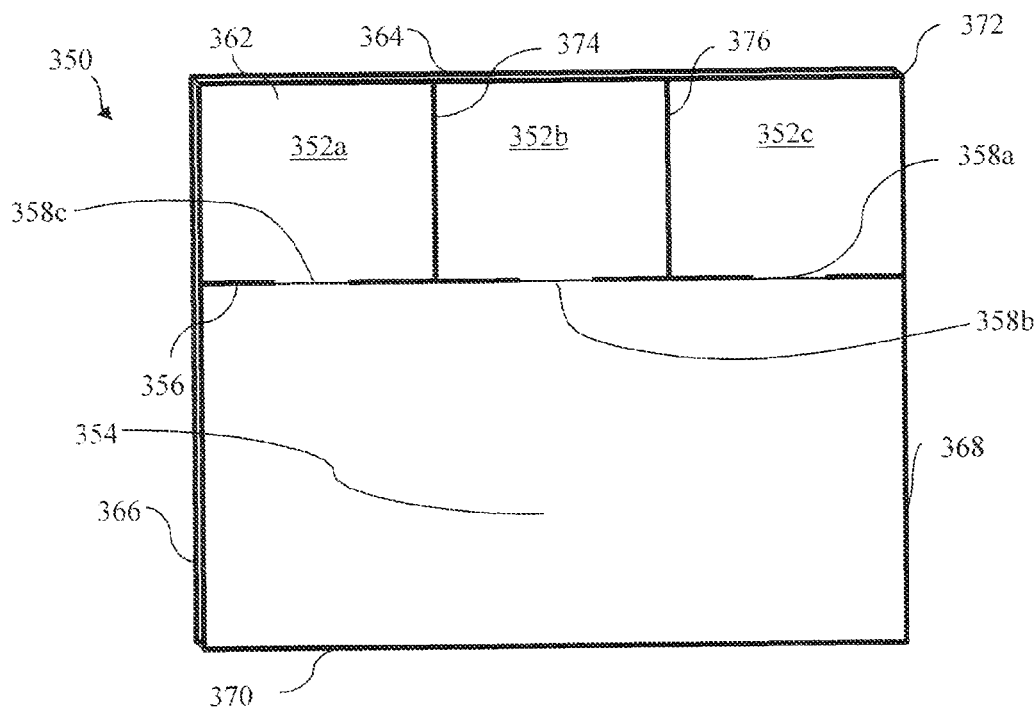
FIG. 12 illustrates an alternate food package having a plurality of compartments for holding food products separately and independently and capable of being mixed individually or collectively by releasing the seals that divide the compartments.

FIG. 12 illustrates a food package 350 in an alternate embodiment of the present invention. The food package 350 may comprise a plurality of side food compartments 352a, 352b, 352c and a main food compartment 354. The food package 350 may be created from a plurality of sheets 362, 364 that may be bounded by a longitudinal marginal edge 366, a longitudinal marginal edge 368, and both a lower transverse seal 370 that closes the food compartment 354 and an upper transverse seal 372 that closes the plurality of side compartments 352a, 352b, 352c. The lower transverse seal 370 and the upper transverse seal 372 may be formed after insertion of a food product into the food compartment 354 and other food products into the plurality of side compartments 352a, 352b, 352c, respectively. The side compartments 352a and 352b may be separated by a vertical seal 374, both parallel to and a length away from longitudinal marginal edge 366. The side compartments 352c and 352b may be separated by a vertical seal 376, both parallel to and a length away from longitudinal marginal edge 368. The food compartment 354 may be separated from the plurality of side compartments 352a, 352b, 352c by a seal 356. The seal 356 may extend the length of food package 350, interrupted by a plurality of releasable seals 358a, 358b, 358c.

The food package 350 may be used to house a food product within the food compartment 354 along with other food products within the plurality of side compartments 352a, 352b, 352c. The other food products may be, but are not limited to, spices, sauces, butters, creams, dressings, seasonings, condiments and/or any other ingredient that may add additional flavor to a food product. A different food product may be inserted into each side compartment 352a, 352b, 352c, such that there may be a choice between which of the other products to use, which other food products to not use, and/or which other food products to mix. For example, a salad may fill the food compartment 354 and three different types of dressing may fill the side compartments 352a, 352b, 352c. A single dressing, multiple dressings, or no dressing at all may be chosen to mix with the salad. Additional food combinations known to one skilled in the art may be used in the present invention, and the examples provided herein are not intended to limit the scope of the present invention The food package 350 may be used to combine the other food products in the side compartments 352a, 352b, 352c with the food product in the food compartment 354. The releasable seals 358a, 358b, 358c associated with the respective desired side product may be opened and the side product may be allowed to mix with the food product in the food compartment 354. Further, the food package 350 may be shaken to mix the combined ingredients to a desired consistency. The plurality of releasable seals 358a, 358b, 358c may each be opened completely, partially, and/or re-sealed such that the desired amount of the side products from the side compartments 352a, 352b, 352c may be mixed with the food product in the food compartment 354.

Figure 13:
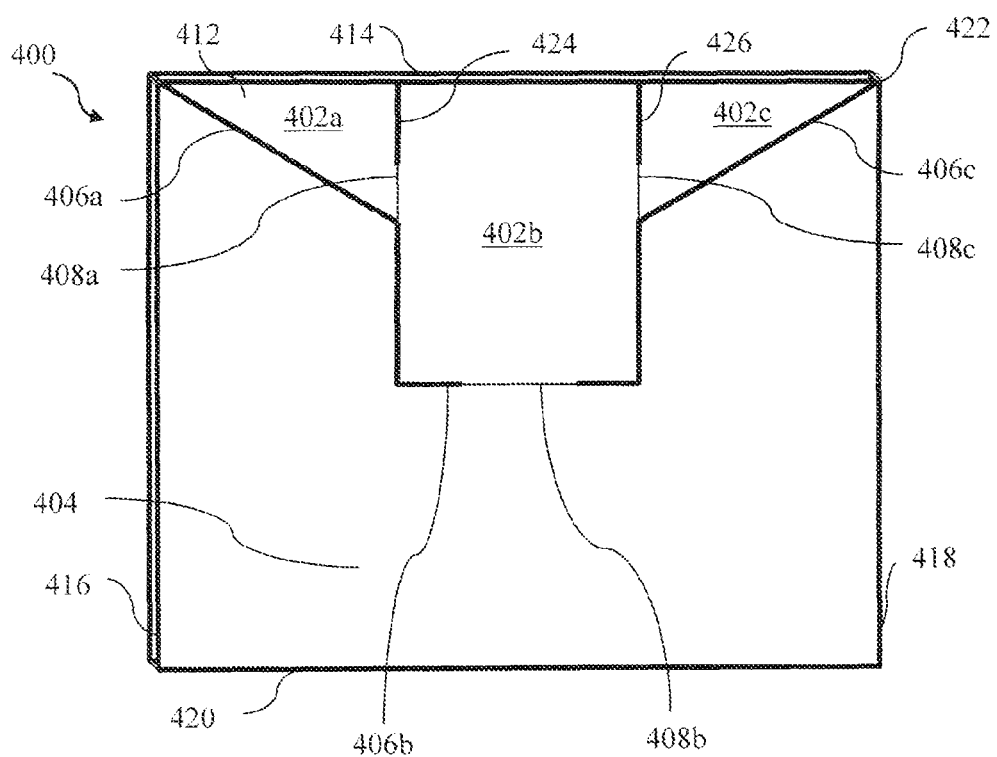
FIG. 13 illustrates an alternate food package having a plurality of small compartments for holding food products separately and independently and a mixing compartment capable of mixing the separated food products in the small compartments together to form a single food product by releasing the seals that divide the compartments.

FIG. 13 illustrates a food package 400 in an alternate embodiment of the present invention. The food package 400 may comprise a plurality of side compartments 402a, 402b, 402c and a food compartment 404. The food package 400 may be created from a plurality of sheets 412, 414 that may be bounded by a longitudinal marginal edge 416, a longitudinal marginal edge 418, and both a lower transverse seal 420 that closes the food compartment 404 and an upper transverse seal 422 that closes the plurality of side compartments 402a, 402b, 402c. The lower transverse seal 420 and the upper transverse seal 422 may be formed after insertion of a food product into the food compartment 404 and ingredients into the plurality of side compartments 402a, 402b, 402c, respectively. The side compartments 402a and 402b may be separated by a vertical seal 424, both parallel to and a length away from longitudinal marginal edge 416, and interrupted by a releasable seal 408a. The side compartments 402b and 402c may be separated by a vertical seal 426, both parallel to and a length away from longitudinal marginal edge 418, and interrupted by a releasable seal 408c.

The food compartment 404 may be separated from the plurality of side compartments 402a, 402b, 402c by a plurality of seals 406a, 406b, 406c. The plurality of seals 406a, 406b, 406c may be designed in numerous ways. In this embodiment, the seal 406a may be diagonal starting from the intersection of the longitudinal marginal edge 416 and the upper transverse seal 422 and extending until intersecting the vertical seal 424. The seal 406b may horizontally extend the length between vertical seal 424 and 426, interrupted by a releasable seal 408b. The seal 406c may be diagonal starting from the intersection of the longitudinal marginal edge 418 and the upper transverse seal 422 and extending until intersecting the vertical seal 426.

The side compartments 402a, 402b, 402c may be used to house a plurality of separated fresh ingredients that may be mixed together to form a single sauce, condiment, dressing, or the like. The releasable seal 408a may be opened allowing the ingredients contained within the side compartment 402a to mix with the ingredients contained in the side compartment 402b. The releasable seal 408c may be opened allowing the ingredients contained within the side compartment 402c to mix with the ingredients contained in the side compartment 402b. The releasable seal 408b may be opened allowing the ingredients contained within the side compartment 402b to mix with a food product contained in the food compartment 404. The releasable seals 408a, 408b, 408c may each be opened completely, partially, and/or re-sealed such that the desired amount of the ingredients from the side compartments 402a, 402b, 402c may be mixed with the food product in the food compartment 404.

Figure 14:
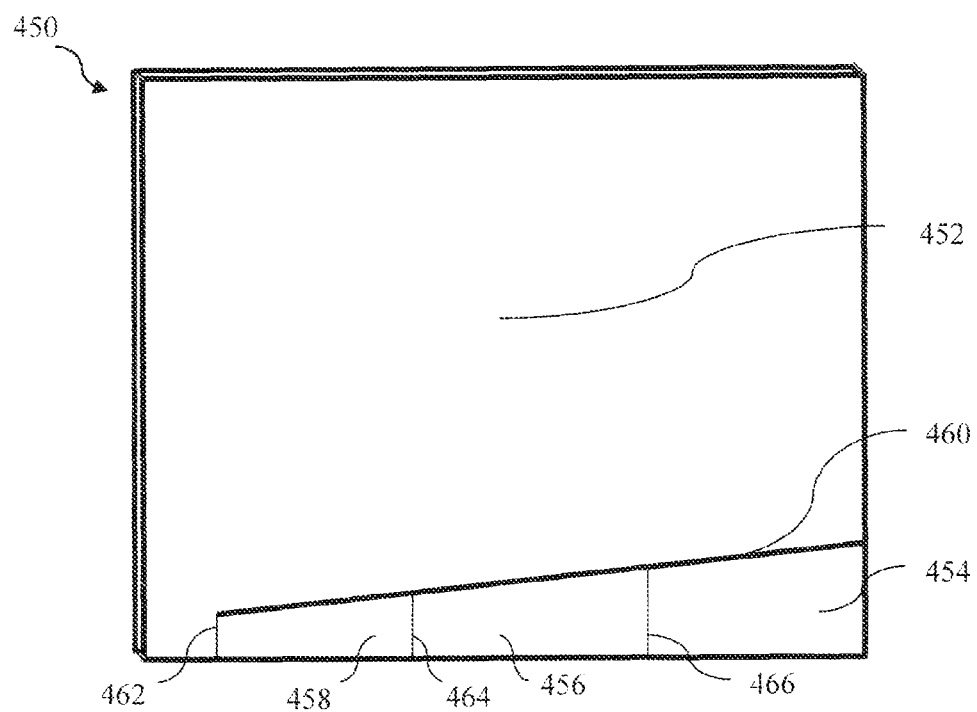
FIG. 14 illustrates an alternate food package having a plurality of compartments for holding food products separately and independently capable of being mixed collectively by releasing the seals that divide the compartments.

As shown in FIG. 14, an alternate embodiment of a food package 450 is shown and described. The food package 450 may comprise a plurality of compartments including a food compartment 452 and a plurality of side compartments 454, 456, 458. The plurality of side compartments 454, 456, 458 may be created by a permanent seal 460 beginning on a first side of food package 450, extending diagonally towards a second side of food package 450, and terminating a length away from the second side of food package 450, and a releasable seal 462 beginning at the end of permanent seal 460 and extending to the bottom of food package 450. The plurality of side compartments 454, 456, 458 may be divided by a plurality of releasable seals 464, 466 such that releasable seal 464 divides side compartment 458 from side compartment 456 and releasable seal 466 divides side compartment 456 from side compartment 454. Releasable seal 466 may be broken or otherwise unsealed, causing side compartment 456 and side compartment 454 to combine, along with any contents within side compartments 456, 454. Similarly, releasable seal 464 may be broken or otherwise unsealed, causing side compartment 458 and side compartment 456 to combine, along with any contents within side compartments 458, 456. Releasable seals 466, 464 may be released simultaneously and may allow side compartments 454, 456, 458 to combine, along with any contents within side compartments 454, 456, 458. Releasable seal 462 may be released and may allow the contents within to enter the food compartment 452 and mix with the contents within the food compartment.

To this end, mixable food products may be packaged separately and freshly combined before consumption. For example, a salad may be placed within the food compartment 452, vinegar may be placed within side compartment 458, a blend of seasoning may be placed within side compartment 456, and an oil may be placed within side compartment 454. The vinegar may be combined with the blend of seasoning by releasing releasable seal 464. The oil may be combined with the vinegar and blend of seasoning combination by releasing releasable seal 466. The combined salad dressing may then be combined with the salad in the food compartment 452 by releasing releasable seal 462. The mixed salad and salad dressing may then be eaten by the consumer.

Of course, other embodiments of the present invention are contemplated, including a single side compartment, two side compartments, or any number of side compartments for holding food products therein for mixing with each other and/or a mixing with a main food product in a main portion of the apparatus. The present invention should not be limited as described herein.

While preferred embodiments of the food cooking package in accordance with the present invention have been illustrated and described, it will be understood by those skilled in the art that changes and modifications may be made therein without departing from the invention in its broader aspects. For example, while the various embodiments are illustrated with a rectangular shaped food package, the package could be made with alternative peripheral shapes while maintaining internal selectively interconnected food product and grease trap compartments.

We claim:

1. An apparatus for preparing cooked food products, the apparatus comprising: a bag formed from at least one sheet of heat resilient plastic film compatible with heating the bag in a cooking process to cook a food product to produce a cooked food product and fluids therein without degrading the bag having at least four side edges and a front and a back forming an interior compartment, the four side edges sealed without interruption to prevent passage of the fluids contained therein produced during the cooking process, the bag further having an imaginary center line between a first side edge and a second side edge, each point on the center line coequal between the first side edge and the second side edge, the bag further comprising a seal sealing the front and the back together along a line and dividing the interior compartment into a first chamber for holding a food product, a second chamber for trapping fluids from the food product upon cooking the same and at least one channel, unobstructed prior to the heating of the bag in the cooking process, to allow the free flow of fluids between the first chamber and the second chamber, the seal extending from and angularly disposed relative to the first side edge and extending uninterrupted to a termination point, the channel bounded on one side by the termination point of the seal, the channel disposed closer to the second side edge than the center line, the first chamber having a tapered shape due to the angularly disposed seal and tapering to the channel between the first chamber and the second chamber, the second chamber allowing passage of cooked fluids at the channel, the second chamber sealed to an outside of the bag to prevent passage of the fluids out of the bag.

2. The apparatus of claim 1 wherein the first chamber, the second chamber, and the channel between the first chamber and the second chamber are further defined by a second seal extending from the second side edge of the apparatus and terminating a length away from the first seal.

3. The apparatus of claim 2 wherein the first chamber, the second chamber, and the channel between the first chamber and the second chamber are formed by the first seal extending from a first edge of the apparatus and terminating at a first point, a second seal extending from a second edge of the apparatus and terminating at a second point, and a perforated seal extending between the first point and the second point.

4. The apparatus of claim 1 wherein the first chamber, the second chamber, and the channel between the first chamber and the second chamber are formed by the first seal extending from a first edge of the apparatus and terminating at a first point and a second seal extending from the first point and terminating at a second edge of the apparatus, wherein the second seal is resealable.

5. The apparatus of claim 1 wherein the channel between the first chamber and the second chamber comprise vertical seals, each of the vertical seals extending from a first point and terminating at a second point, aligned in parallel fashion.

6. The apparatus of claim 1 wherein at least one of the first and second chambers comprises a gusset.

7. The apparatus of claim 1 further comprising a material selected from the group consisting of a conductor, a susceptor, an insulator, a reflector, and any combination thereof.

8. The apparatus of claim 1 further comprising a valve for relieving pressure from within the apparatus.

9. The apparatus of claim 1 further comprising:
a third chamber having a shape; and
a channel between the first chamber and the third chamber.

10. The apparatus of claim 1 further comprising:
a third chamber having a shape; and
a channel between the second chamber and the third chamber.

11. The apparatus of claim 10 further comprising a channel between the first chamber and the third chamber.

12. The apparatus of claim 1 wherein at least one of the side edges comprises a resealable seal.

13. The apparatus of claim 1 wherein the channel is bounded on a second side by the second side edge of the bag.

* * * * *